Dec. 26, 1961  L. S. KOHN ETAL  3,014,826
ELECTRICAL CORE STRUCTURES
Filed Dec. 29, 1960
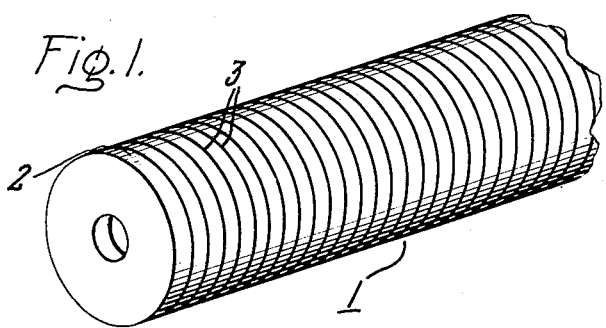
Inventors
Leo S. Kohn
Justin W. Gucz
by
Their Attorney

3,014,826
ELECTRICAL CORE STRUCTURES
Leo S. Kohn and Justin W. Gucz, Schenectady, N.Y., assignors to General Electric Company, a corporation of New York
Filed Dec. 29, 1960, Ser. No. 79,408
9 Claims. (Cl. 154—43)

This invention relates to electrical core structures. More particularly, it relates to such structures which have desirable electrical and physical characteristics at elevated temperatures and under high pressure.

In the manufacture of magnetic core structures for electrical equipment such as solenoids, transformers, motors, generators, and the like, such cores are, in order to reduce eddy current and heat losses, made up of a plurality of reltaively thin laminations which are bonded together and insulated one from the other with varnishes, enamels, paints, and the like. Among the most useful insulating varnishes used for such purpose have been the filled phenolic resin varnishes, such varnishes being quite resistant to temperatures up to the order of about 80 to 135° C. However, with increase in capacity of electrical machinery and the emphasis placed upon reducing the size of electrical equipment or conversely increasing the capacity for a given size, it was necessary because of temperatures of the order of 175° C. and higher and the requirement that the laminations be resistant to higher pressures, that the phenolic varnishes be replaced with more resistant materials even though those presently employed were filled with inorganic fillers such as silica, and the like. While such filled phenolic varnishes are useful in some respects, they are characterized by definite limitations. For example, such varnishes are suitable only up to operating temperatures of about 135° C. Furthermore, the application of such varnishes or enamels to the laminations as by the useful application methods of brushing, spraying, rolling, dipping, and the like is hampered by the settling out of the inert insulating filler. Also, the cured, filled varnish flows under pressure and temperature so that local pressure concentrations displace both filler and varnish resulting in electrical shorts. Thus, the filler does not serve its intended purpose. Furthermore, the high viscosity of the filled varnish requires large film thicknesses if uniformity of the film and complete coverage of the lamination is to be obtained. In order to attain complete uniform coverage of a lamination, the thickness of such films must be of the order of 0.5 mil. It will at once be apparent that with the laminations ranging typically, for example, for about 10 to 15 mils in thickness, the thickness of such insulating varnish is a substantial percentage of the total thickness of the insulated lamination. It will also be quite apparent that there is a definite need for core plate structures which are capable of being adequately insulated by varnish films substantially less than those previously attainable. For example, varnish films of the order of 0.1 to 0.2 mil would present a major improvement in the stacking factor of any electrical machine in which such laminations or cores are used, the stacking factor being the ratio of the final over-all dimension of a core to the sum of the indivdual uninsulated laminations or plates in the core.

A principal object, therefore, of this invention is to provide core structures for electrical machinery which are characterized by a much lower stacking factor than has heretofore been obtainable, said core structures being additionally resistant to elevated temperatures including momentarily severe over-temperatures such as occur during faulty operation of the equipments and pressures without excessive electrical conductance or shorting.

Briefly, the invention relates to improved electrical core structures, the plates or laminations of which are insulated with an improved varnish or enamel comprising methylphenylpolysiloxane resin containing lower alkyl orthotitanate esters and triethanolamine.

Those features of the invention which are believed to be novel are set forth in detail in the claims appended hereto. The invention will, however, be better understood and further advantages and objects thereof appreciated from a consideration of the following description taken in conjunction with the drawing in which FIGURE 1 is a simple diagrammatic representation of a typical core plate structure and FIGURE 2 is a view of a single coated lamination.

The methylphenylpolysiloxanes of the present invention are well known in the art and are set forth, for example, in Patent 2,258,222—Rochow, assigned to the same assignee as this invention.

The lower alkyl orthotitanate esters which have been found useful in the present invention are monomeric orthotitanates of the formula $(RO)_4Ti$, where R is a lower alkyl radical, including among others, methyl, ethyl, propyl, isopropyl, butyl, decyl, 2-ethylhexyl, etc., and R preferably contains from about 3 to 10 carbon atoms. Mixed esters are also useful.

It has been found that of the ethanolamines only triethanolamine is useful in connection with this invention, the dimethanolamines and monoethanolamines being unsuitable because of their lower crosslinking ability.

In general, it has been found that the useful polysiloxane-titanate ester-triethanolamine compositions of this invention contain for each 100 parts, by weight, of polysiloxane from about 30 to 60 parts of a mixture of orthotitanate ester and triethanolamine. Preferably, the enamel contains 50 parts, by weight, of the above orthotitanate-triethanolamine composition for each 100 parts, by weight, of polysiloxane. As to the proportions of ingredients in the titanate-triethanolamine mixture, there should be as a minimum enough titanate to form the complex with the triethanolamine and actually an excess of titanate does no harm. Thus, using tetrabutyl titanate the minimum weight ratio of titanate and amine should be 1.14; using tetrapropyl titanate it should be 0.95, and using tetra 2-ethyl hexy titanate it should be 1.88. With tetrabutyl titanate a ratio of from about 2 to 1.5 has been found very useful. It will be understood, of course, that commercially available titanate-triethanolamine complexes as above can also be used.

The enamel or varnish of the invention can be applied to the laminations by any of the usual methods, such as dipping, spraying, rolling, brushing, and the like. After application, the enamel is cured at temperatures ranging from about 350° C. to 500° C. for periods ranging from about one-half minute to one minute. A preferred curing cycle is 450° C. for one minute.

As exemplary of the present invention a test core consisting of nine laminations of magnetic steel, each about 13 mils in thickness, was prepared, each lamination having a uniform coating on each side thereof about 0.2 mil thick of a varnish containing, by weight, 100 parts methy phenylpolysiloxane and 50 parts of tetrabutyl titanate-triethanolamine in which the weight ratio of titanate to triethanolamine was 2:1.

There was also prepared for comparison purposes a similar core with a varnish consisting of an oil-modified phenolic resin containing 12 to 15 percent by weight of finely divided silica, it being found that the minimum thickness of such varnish which could be applied uniformly and completely to laminations was about 0.5 mil per side.

When the above assembled core structures were subjected to a pressure of 500 p.s.i., and to a potential difference of 10 volts A.C. R.M.S. at various temperatures in an oven having a hydrogen atmosphere, the current in milliamperes (ma.) at various temperatures passing from one lamination face to the other was as shown in the following table:

| Temperature, °C. | Current (ma.) | |
|---|---|---|
| | Phenolic | Present Invention |
| 70 | 18 | 0.50 |
| 100 | 18 | 0.50 |
| 155 | 22 | 0.50 |
| 200 | 44 | 0.50 |
| 300 | 46 | 0.60 |
| 400 | 50 | 0.60 |
| 500 | 51 | 0.60 |
| 565 | 51 | 36 |
| 600 | 51 | 46 |

From the above table, it will be quite apparent that the current leakage or electrical conductivity through the above-described core structure insulated with the unfilled organopolysiloxane-titanate-triethanolamine composition of this invention is very low up to temperatures of 500° C. On the other hand, using the above-described phenolic varnish, even in an excessively greater thickness, the current leakage is quite substantial even at temperature of 70° C. and rises precipitately between 155° C. and 200° C.

Core structures similar to that above, once again, containing filled phenolic varnish coatings and organopolysiloxane coatings as above were tested as described above except that during the test the core structure was subjected to a vibration of low amplitude (0.005 mil, 120 cycles). It was found that a definite break or increase in conductivity occurred at 265° C. for the filled phenolic type varnish, whereas a substantial increase in conductivity of the core structure of the present invention, insulated as described, did not occur until a temperature of over 600° C. had been attained. From the above, it can readily be seen that the core structures of this invention are much more resistant to vibration such as that which occurs in actual operation than are those of the prior art.

Shown in FIGURE 1 is an electrical magnetic core 1 having laminations or plates 2 of suitable shape and size. Laminations 2 are of magnetic metal and are insulated and separated from one another as best shown in FIGURE 2 by a layer 3 of the varnish or enamel of this invention placed on either side of the laminations.

There are provided by the present invention improved electrical core structures for electrical machinery such as solenoids, transformers, and motor and generator stators and rotors. These cores are characterized by improved stacking factors which permit an increase in capacity of cores of the same size or conversely permit substantial size reductions in cores of a given capacity. This is illustrated by the fact that the individual laminations or plates of the present cores are capable of being insulated with a varnish or enamel thickness of only about 0.1 to 0.2 mil as compared with 0.5 mil of the prior art structures. Furthermore, uniform and complete coverage of individual laminations is obtainable with such limited thicknesses with enough flexibility to prevent cracking and shorting. Films in excess of such thickness have been found to crack excessively. As pointed out above, the present core structures are far and away superior at elevated temperatures and under high pressures than are typical prior art cores and this superiority is retained even during vibration of the core such as may be experienced in actual operation.

What we claim as new and desire to secure by Letters Patent of the United States is:

1. An electrical core structure comprising a plurality of metal laminations, said laminations being coated with an enamel comprising, by weight, 100 parts of methylphenylpolysiloxane and 30 to 60 parts of a mixture of lower alkyl orthotitanate and triethanolamine, the weight ratio of titanate and amine in said mixture being such that there is an excess of titanate over that required to form the titanate-amine complex.

2. An electrical core structure comprising a plurality of metal laminations, said laminations being coated with an enamel comprising, by weight, 100 parts of methylphenylpolysiloxane and 50 parts of a mixture of lower alkyl orthotitanate and triethanolamine, the proportions of titanate and triethanolamine in said mixture being such that there is an excess of titanate over that required to form the titanate-amine complex.

3. An electrical core structure comprising a plurality of magnetic laminations, said laminations having interposed therebetween a varnish comprising, by weight, 100 parts of methylphenylpolysiloxane and 30 to 60 parts of a mixture of tetrabutyl titanate and triethanolamine, the weight ratio of titanate to triethanolamine being at least 1.14.

4. An electrical core structure comprising a plurality of magnetic plates, said plates having interposed therebetween an enamel comprising, by weight, 100 parts of methylphenylpolysiloxane and 50 parts of a mixture of tetrabutyl titanate and triethanolamine in which the weight ratio of titanate to triethanolamine is two.

5. An electrical core structure comprising a plurality of magnetic laminations, said laminations having interposed therebetween a varnish comprising, by weight, 100 parts of methylphenylpolysiloxane and 30 to 60 parts of a mixture of tetrabutyl titanate and triethanolamine, the weight ratio of titanate and triethanolamine in said mixture ranging from about 2 to 1.5.

6. An electrical core structure comprising a plurality of metal plates, said plates having interposed therebetween a varnish comprising, by weight, 100 parts of methylphenylpolysiloxane and 30 to 60 parts of a mixture of a tetrapropyl titanate and triethanolamine, the weight ratio of titanate and triethanolamine in said mixture being at least 0.95.

7. An electrical core structure comprising a plurality of metal plates, said plates having interposed therebetween a varnish comprising, by weight, 100 parts of methylphenylpolysiloxane and 30 to 60 parts of a mixture of tetra-2-ethylhexyl titanate and triethanolamine, the weight ratio of titanate in said mixture being at least 1.88.

8. An electrical core structure comprising a plurality of metal plates, said plates having interposed therebetween a varnish comprising, by weight, 100 parts of methylphenylpolysiloxane and 50 parts of a mixture of tetrapropyl titanate and triethanolamine, the weight ratio of titanate and triethanolamine in said mixture being at least 0.95.

9. An electrical core structure comprising a plurality of metal plates, said plates having interposed therebetween a varnish comprising, by weight, 100 parts of methylphenylpolysiloxane and 50 parts of a mixture of tetra-2-ethylhexyl titanate and triethanolamine, the weight ratio of titanate in said mixture being at least 1.88.

References Cited in the file of this patent

UNITED STATES PATENTS

| 2,542,048 | Nagel | Feb. 20, 1951 |
| 2,735,791 | Peyrot et al. | Aug. 2, 1954 |
| 2,868,750 | Gilkey | Jan. 13, 1959 |
| 2,970,122 | McLoughlin | Jan. 31, 1961 |